United States Patent
Zhou et al.

(10) Patent No.: US 8,645,597 B2
(45) Date of Patent: Feb. 4, 2014

(54) MEMORY BLOCK RECLAIMING JUDGING APPARATUS AND MEMORY BLOCK MANAGING SYSTEM

(75) Inventors: Lian Zhou, Shenzhen (CN); Fan Jiang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 597 days.

(21) Appl. No.: 13/060,400

(22) PCT Filed: Aug. 7, 2009

(86) PCT No.: PCT/CN2009/000898
§ 371 (c)(1),
(2), (4) Date: Feb. 23, 2011

(87) PCT Pub. No.: WO2010/022582
PCT Pub. Date: Mar. 4, 2010

(65) Prior Publication Data
US 2011/0179236 A1 Jul. 21, 2011

(30) Foreign Application Priority Data
Aug. 29, 2008 (CN) .......................... 2008 1 0141723

(51) Int. Cl.
*G06F 13/10* (2006.01)
(52) U.S. Cl.
USPC .............................................. 710/56; 710/34
(58) Field of Classification Search
None
See application file for complete search history.

(56) References Cited

U.S. PATENT DOCUMENTS

| 6,304,880 B1 | 10/2001 | Kishi |
| 7,234,030 B1 | 6/2007 | Gupta et al. |
| 2002/0181469 A1 | 12/2002 | Furusawa |

FOREIGN PATENT DOCUMENTS

CN 1960322 5/2011

OTHER PUBLICATIONS

International Search Report, mailing date of Oct. 29, 2009.

*Primary Examiner* — Cheng-Yuan Tseng
(74) *Attorney, Agent, or Firm* — McClure, Qualey & Rodack, LLP

(57) ABSTRACT

A memory block reclaiming judging apparatus and a memory block managing system are disclosed in the present invention. The memory block reclaiming judging apparatus comprises a peripheral information accessing unit, a data packet information recording unit, a data calculating unit, and a comparing and judging unit, wherein the data calculating unit is configured to calculate remaining scheduling times of a data packet and write the remaining scheduling times of the data packet into the data packet information recording unit, and meanwhile set a flag for indicating acquirement of information of the required scheduling times as valid; the comparing and judging unit is configured to generate a memory block reclaiming instruction, reset the remaining scheduling times of the data packet in the data packet information recording unit to an initial value, and set the flag for indicating acquirement of information of the required scheduling times as invalid.

16 Claims, 2 Drawing Sheets

US 8,645,597 B2

MEMORY BLOCK RECLAIMING JUDGING APPARATUS AND MEMORY BLOCK MANAGING SYSTEM

CROSS-REFERENCE TO RELATED APPLICATION

This application is a co-pending application which claims priority to PCT Application No. PCT/CN2009/000898, filed Aug. 7, 2009, with the Chinese Patent Office, which claims priority to Chinese Patent Application 200810141723.8 filed on Aug. 29, 2008 each of these applications being incorporated herein by reference in their entirety.

TECHNICAL FIELD

The present invention relates to memory block management in the field of communication and electronics, and in particular, to a memory block reclaiming judging apparatus and a memory block managing system.

BACKGROUND ART

In the field of communication and computer, it generally needs to store and forward data packets, and the storage device is generally a big read/write memory. In order to facilitate management and improve utilization, this big piece of memory is logically divided into a plurality of small blocks, which are called as memory blocks. Each memory block has an index. In principle, one memory block can only store one data packet at most, and one data packet may occupy a plurality of memory blocks. In the process of scheduling data packets, the index of the memory block occupied by the header of the data packet is usually used as the index of the data packet. When there is a data packet that need to be buffered, idle memory blocks are assigned for storage; after the data packet is scheduled out, the memory block occupied by the data packet needs to be released for subsequent use. This process is generally called as reclaiming of a memory block.

A reclaiming judging apparatus is used to judge when to reclaim the memory block. As for data packets of unicast type, reclaiming can be performed after the data packet is scheduled for one time; as for data packets of multicast type, reclaiming can only be performed after the data packet has been scheduled for a specified number of times. The reclaiming judging apparatus has to obtain the required scheduling times for the data packet from an upstream module on one hand, and calculate the times that the data packet has been scheduled on the other hand. Regarding the same data packet, these two kinds of information are not necessarily acquired in a fixed sequence. In the existing method, usually two sets of registers or memories are used, one set recording the required scheduling times for memory block/data packet, and the other recording the times that the data packet has been scheduled, and it is judged whether to reclaim the memory block occupied by the data packet by comparing the two kinds of information.

However, as for a large number of data packets, these two sets of registers will consume a large amount of resources. In terms of processing, some methods manage based on memory blocks, but there is certain difficulty in reclaiming as for a data packet occupying a plurality of memory blocks.

SUMMARY OF THE INVENTION

Due to the above reasons, the present invention provides a memory block reclaiming judging apparatus and a memory block managing system, which can reduce the memory space occupied by the memory block reclaiming judging apparatus, and simplify judgment for reclaiming a memory block.

In order to solve the above technical problem, the present invention provides the following technical solution;

a memory block reclaiming judging apparatus comprises a peripheral information accessing unit, a data packet information recording unit, a data calculating unit, and a comparing and judging unit, wherein, the peripheral information accessing unit is configured to buffer and read required scheduling times for a data packet and single-time scheduled information, and transmit the required scheduling times for the data packet and the single-time scheduled information to the data calculating unit;

the data packet information recording unit is configured to store remaining scheduling times of the data packet and a flag for indicating acquirement of information of the required scheduling times;

the data calculating unit is configured to calculate remaining scheduling times of the data packet based on the required scheduling times for the data packet and single-time scheduled information, and write the remaining scheduling times of the data packet into the data packet information recording unit, and meanwhile set the flag for indicating acquirement of information of the required scheduling times as valid; and the comparing and judging unit is configured to generate a memory block reclaiming instruction when it is judged that the remaining scheduling times of the data packet is 0 and the flag for indicating acquirement of information of the required scheduling times is valid, reset the remaining scheduling times of the data packet in the data packet information recording unit to an initial value, and set the flag for indicating acquirement of information of the required scheduling times as invalid.

Furthermore, the peripheral information accessing unit may comprise a first buffer, a second buffer and a polling unit, wherein the first buffer buffers the required scheduling times for the data packet, the second buffer buffers the single-time scheduled information of the data packet, and the polling unit is configured to poll the two buffers according to full-empty status thereof, and read data in the two buffers and transmit the data to the data calculating unit.

In said memory block reclaiming judging apparatus, the mode for the data calculating unit to calculate the remaining scheduling times of the data packet based on the required scheduling times for the data packet and the single-time scheduled information may be as follows:

setting the remaining scheduling times for the data packet as the required scheduling times if the data are received from the first buffer; and subtracting 1 from the remaining scheduling times for the data packet as a new number of remaining scheduling times for the data packet if the data are received from the second buffer.

In said memory block reclaiming judging apparatus, the first buffer and the second buffer are FIFO (first in first out) buffers.

In said memory block reclaiming judging apparatus, the initial value of the remaining scheduling times for the data packet in the data packet information recording unit may be a maximum number of times that the data packet is possibly scheduled.

The present invention further discloses a memory block managing system, the memory block being used to store data packets, and the system comprising a peripheral information generating apparatus, a memory block reclaiming judging apparatus and a memory block reclaiming apparatus, wherein the memory block reclaiming judging apparatus comprises a peripheral information accessing unit, a data packet information recording unit, a data calculating unit, and a comparing and judging unit, wherein the peripheral information accessing unit is configured to buffer and read required scheduling times for a data packet and single-time scheduled information, and transmit the required scheduling times for the data packet and the single-time scheduled information to the data calculating unit;

the data packet information recording unit is configured to store remaining scheduling times of the data packet and a flag for indicating acquirement of information of the required scheduling times;

the data calculating unit is configured to calculate the remaining scheduling times of the data packet based on the required scheduling times for the data packet and single-time scheduled information, and write the remaining scheduling times of the data packet into the data packet information recording unit, and meanwhile set the flag for indicating acquirement of information of the required scheduling times as valid;

the comparing and judging unit is configured to generate a memory block reclaiming instruction when it is judged that the remaining scheduling times of the data packet is 0 and the flag for indicating acquirement of information of the required scheduling times is valid, reset the remaining scheduling times of the data packet in the data packet information recording unit to an initial value, and set the flag for indicating acquirement of information of the required scheduling times as invalid;

the peripheral information generating unit is configured to generate the required scheduling times for the data packet and the single-time scheduled information, and write the required scheduling times for the data packet and the single-time scheduled information into the peripheral information accessing unit; and the memory block reclaiming apparatus is configured to reclaim the memory block according to the memory block reclaiming instruction generated by the comparing and judging unit.

In said memory block managing system, the peripheral information accessing unit may comprise a first buffer, a second buffer and a polling unit, wherein the first buffer buffers the required scheduling times for the data packet, the second buffer buffers the single-time scheduled information of the data packet, and the polling unit is configured to poll the two buffers according to full-empty status thereof and the second buffer, and read data in the two buffers and transmit the data to the data calculating unit.

In said memory block managing system, the mode for the data calculating unit to calculate the remaining scheduling times of the data packet based on the required scheduling times for the data packet and the single-time scheduled information may be as follows:

setting the remaining scheduling times for the data packet as the required scheduling times if the data are received from the first buffer; and subtracting 1 from the remaining scheduling times for the data packet as a new number of remaining scheduling times for the data packet if the data are received from the second buffer.

In said memory block managing system, the first buffer and the second buffer are FIFO (first in first out) buffers.

In said memory block managing system, the initial value of the remaining scheduling times for the data packet in the data packet information recording unit may be a maximum number of times that the data packet is possibly scheduled.

In the present invention, a peripheral information accessing unit is used to buffer and read required scheduling times for a data packet and single-time scheduled information, a data packet information recording unit is used to store remaining scheduling times of the data packet and a flag for indicating acquirement of information of the required scheduling times; then a data calculating unit is used to calculate the remaining scheduling times of the data packet based on the required scheduling times for the data packet and single-time scheduled information, and finally a comparing and judging unit is used to generate a memory block reclaiming instruction when it is judged that the remaining scheduling times of the data packet is 0 and the flag for indicating acquirement of information of the required scheduling times is valid. The present invention does not need to use two sets of memories as in the prior art, instead, only a data packet information recording unit is used to record the remaining scheduling times for each data packet, and the volume of the memory space is substantially equivalent to that of one set memory in the prior art. The above configuration makes it unnecessary for the peripheral information accessing unit to be configured according to the number of data packets, thus saving about half of the memory space. Moreover, the method for judging reclaiming is relatively easy as compared with the judging method based on memory blocks.

PREFERRED EMBODIMENTS OF THE INVENTION

The present invention will be descried in detail below with reference to drawings and specific embodiments.

Figure 1:
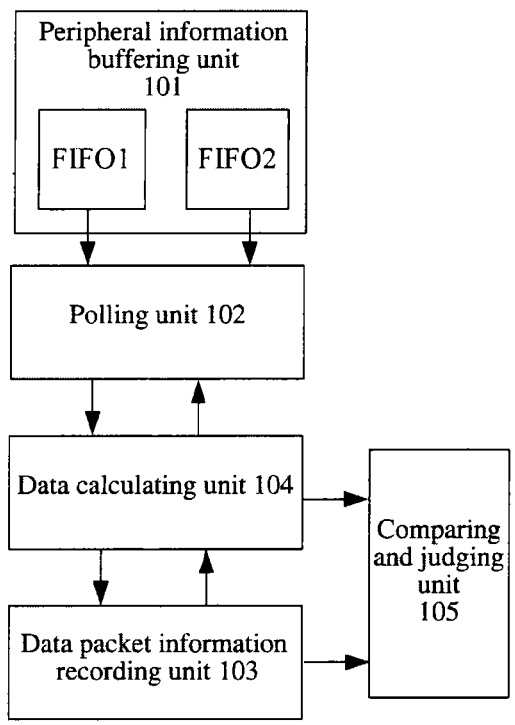
FIG. 1 illustrates the structure of the memory block reclaiming judging apparatus according to a specific embodiment of the present invention.
Figure 3:
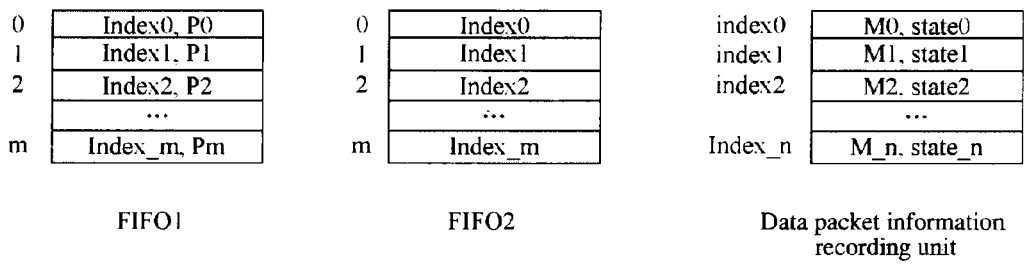
FIG. 3 illustrates the storage structures of FIFO1, FIFO2 and data packet information recording unit as shown in FIG. 1.

As shown in FIG. 1, the memory block reclaiming judging apparatus according to a specific embodiment of the present invention consists of five major parts, namely, a peripheral information buffering unit 101, a polling unit 102, a data packet information recording unit 103, a data calculating unit 104, and a comparing and judging unit 105. Wherein, since the peripheral information buffering unit 101 and polling unit 102 together play the function of buffering and reading peripheral information, they are collectively referred to as a peripheral information accessing unit so as to indicate that function of accessing peripheral information can also be performed by one module. The peripheral information buffering unit 101 has two separate buffers of FIFO1 and FIFO2 for storing multicasting times of the data packet from a peripheral module respectively, i.e., the total number of required scheduling times for the data packet and single-time scheduled information from the peripheral module; the storage structures of FIFO1 and FIFO2 are shown in FIG. 3, and stored data are managed in First In First Out mode, wherein the data of FIFO1 are from multicasting times of the data packet of the peripheral module, i.e., the total number of required scheduling times for the data packet, and the storage entry is {packet_index, P}, index being an index number of the data packet, which is generally the index of the memory block occupied by the header of the data packet; the data of FIFO2 are from the single-time scheduled information of the data packet from the peripheral module, and the storage entry is {packet_index}. In this example, the lengths of the two FIFOs are both configured as m+1, but they can also be configured as different in practical application; the polling unit 102 is used to select a group of information for data calculation from the peripheral information buffering unit 101; the data packet information recording unit 103 is divided into a plurality of entries, each entry corresponds to the index (which is generally the index of the memory block occupied by the header of the data packet) of each data packet respectively to record related information of each data packet, including whether the total number of required scheduling times for the data packet has been obtained or not, and the current remaining scheduling times of the data packet; the data calculating unit 104 is used to calculate the remaining scheduling times of each data packet; the comparing and judging unit 105 is used to judge whether to reclaim the data packet according to the calculation result of the data calculating unit 104, and send out a reclaiming instruction to a downstream module for reclaiming the memory block.

In order to achieve the above purpose, judging whether to reclaim a memory block in accordance with the present invention is performed according to the following steps:

1. The index of the data packet from a peripheral module and the total number of required scheduling times are written into the first one of FIFOs (first in first out) of the peripheral information buffering unit 101 (i.e., FIFO1 shown in FIG. 1);

2. The scheduled information of the data packet from the peripheral module is written into the second one of FIFOs of the peripheral information buffering unit 101 (i.e., FIFO2 shown in FIG. 2), the index of the data packet being written for one time as the data packet is scheduled for one time.

Figure 2:
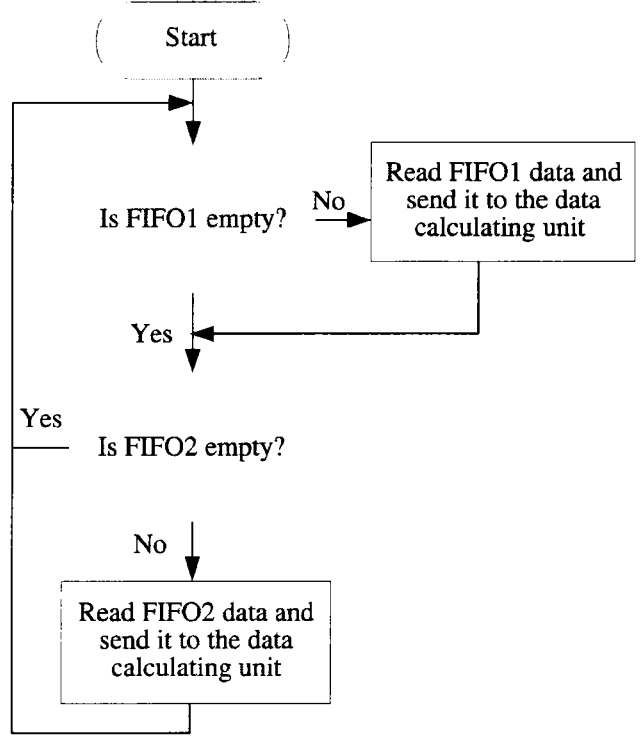
FIG. 2 is a working flow of the polling unit as shown in FIG. 1.

3. As shown in FIG. 2, the polling unit 102 performs polling based on the full-empty status of the two FIFOs, and data are read out from the two buffers in turn if neither of the two FIFOs is empty; if one of the two FIFOs is empty, then data are read out from the FIFO that is not empty; the data read out are sent to the data calculating unit 104. Especially, since some time is taken to calculate and store data, the signal line from the data calculating unit 104 to the polling unit 102 indicates that the polling unit 102 can accept data of the next time.

4. The storage structure of the data packet information recording unit 103 is as shown in FIG. 3, each data packet corresponds to one storage unit, the index of the data packet is used as the address of the storage unit, and as for each data packet, its storage entry is {M, state}, wherein M is the remaining scheduling times of the data packet to be modified, and it equals to N when initialized, and state is a flag for indicating acquirement of information of the required scheduling times, representing whether the data packet has acquired the total number of required scheduling times as the data packet from the peripheral module, being 0 means "has not acquired", while being 1 means "has acquired", and it is set as 0 when initialized. After initial reset, the information corresponding to each data packet is reset as {N, 0}, wherein N represents the maximum multicasting times supported by the system, i.e., the maximum number of times that the data packet may be scheduled.

5. After the data calculating unit 104 receives data from step 3, it reads out the information {M, state} of the data packet from the data packet information recording unit 103, and carries out the following calculation: if the data are received from FIFO2, then the new value of M is M_new=M−1; if the data are received from FIFO1, i.e., the data is the total number of required scheduling times (assumed as P), then the new value of M is M_new=M−N+P. It should be pointed out that M here is calculated based on the index number of the data packet, but the index number of a data packet cannot be repeatedly used before the data packet is reclaimed, therefore, the same data packet can only obtain the total number of required scheduling times from FIFO1 for one time; meanwhile, state bit is set as 1. Afterwards, the updated {M_new, state} is written into the corresponding address space in the data packet information recording unit 103 once again.

6. The comparing and judging unit 105 judges whether to reclaim the data packet according to the calculation results in step 5, i.e., the remaining scheduling times of the data packet M and the flag for indicating acquirement of information of the required scheduling times (i.e., state). If the remaining scheduling times of the data packet is 0, and state is 1, it is judged that the data packet should be reclaimed, a reclaiming instruction is sent to a downstream module, and the data packet information {N, 0} is written into the address space corresponding to the index of the data packet in the data packet information recording unit 103 for reset. Otherwise, the data packet is not reclaimed.

Figure 4:
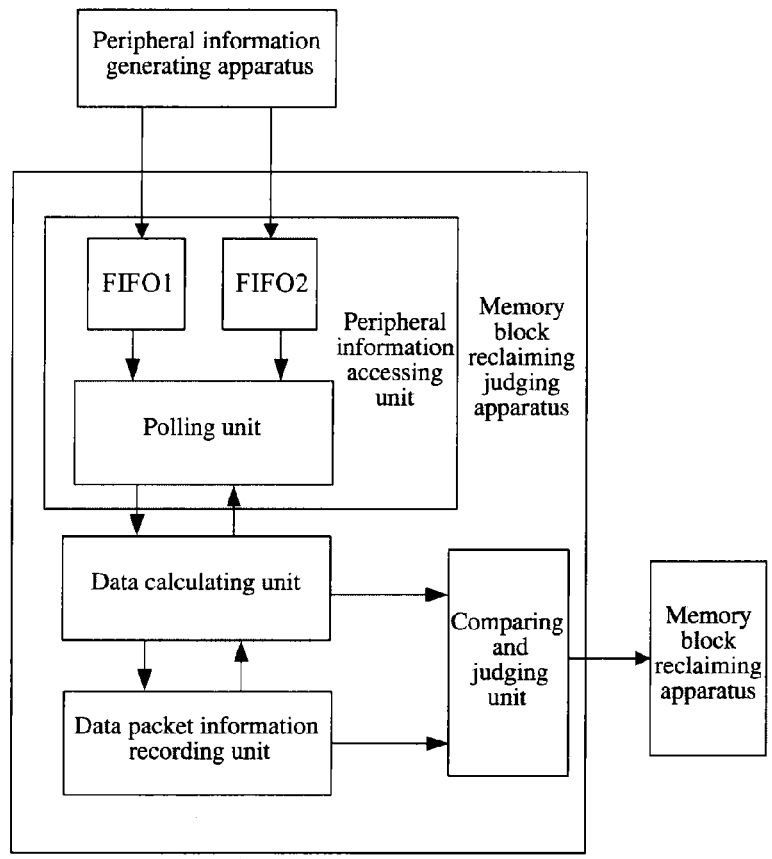
FIG. 4 illustrates the structure of the memory block managing system according to a specific embodiment of the present invention.

As shown in FIG. 4, it shows a memory block managing system according to a specific embodiment of the present invention, comprising a peripheral information generating apparatus, a memory block reclaiming judging apparatus and a memory block reclaiming apparatus, wherein the peripheral information generating apparatus is precisely the aforesaid peripheral module used to generate peripheral information for judging whether to reclaim a memory block, the memory block reclaiming judging apparatus is precisely the aforesaid memory block reclaiming judging apparatus of the present invention, and the memory block reclaiming apparatus is precisely the aforesaid downstream module used to perform reclaiming of the memory block according to a reclaiming judging instruction.

Currently, in a case of multicast, a memory block reclaiming judging apparatus needs to occupy a large number of resources, and there is also certain difficulty in reclaiming judgment for a data packet occupying a plurality of memory blocks. The present invention implements a reclaiming judging apparatus that is efficient and saves storage space, and with the above structure and operating method disclosed in the present invention: the data packet multicasting times from a peripheral module and data packet single-time scheduling information from the peripheral module are firstly buffered; information is sent to a data calculating unit from the buffer through a polling unit; a new M value and state are calculated according to the information read out from the data packet information recording unit and information from the polling unit, and it is judged whether to reclaim the memory block occupied by the data packet based on the calculation results; two groups of values can be combined in one storage space to reduce the storage space occupied by reclaiming judgment, and reclaiming is performed based on the data packet, thus simplifying reclaiming judgment of the memory block.

The above content is intended to further describe the present invention in detail with reference to specific preferred embodiments, but not to limit the specific embodiments of the present invention to this description. A person skilled in the art can make several simple deductions or replacements without departing from the conception of the present invention, but those deductions or replacements shall be construed as within the protection scope of the present invention.

INDUSTRIAL APPLICABILITY

The present invention does not need to use two sets of memories as in the prior art, instead, only a data packet information recording unit is used to record the remaining scheduling times for each data packet, and the volume of the memory space is substantially equivalent to that of one set memory in the prior art. The above configuration makes it unnecessary for the peripheral information accessing unit to be configured according to the number of data packets, thus saving about half of the memory space. Moreover, the method for judging reclaiming is relatively easy as compared with the judging method based on memory blocks.

What we claim is:

1. A memory block reclaiming judging apparatus comprising a peripheral information accessing unit, a data packet information recording unit, a data calculating unit, and a comparing and judging unit, wherein,
    the peripheral information accessing unit is configured to buffer and read required scheduling times for a data packet and single-time scheduled information, and transmit the required scheduling times for the data packet and the single-time scheduled information to the data calculating unit;
    the data packet information recording unit is configured to store remaining scheduling times of the data packet and a flag for indicating acquirement of information of the required scheduling times;
    the data calculating unit is configured to calculate remaining scheduling times of the data packet based on the required scheduling times for the data packet and the single-time scheduled information, and write the remaining scheduling times of the data packet into the data packet information recording unit, and meanwhile set the flag for indicating acquirement of information of the required scheduling times as valid; and
    the comparing and judging unit is configured to generate a memory block reclaiming instruction when it is judged that the remaining scheduling times of the data packet is 0 and the flag for indicating acquirement of information of the required scheduling times is valid, reset the remaining scheduling times of the data packet in the data packet information recording unit to an initial value, and set the flag for indicating acquirement of information of the required scheduling times as invalid.

2. The memory block reclaiming judging apparatus according to claim 1, wherein, the peripheral information accessing unit comprises a first buffer, a second buffer and a polling unit, wherein the first buffer buffers the required scheduling times for the data packet, the second buffer buffers the single-time scheduled information of the data packet, and the polling unit is configured to poll the two buffers according to full-empty status thereof, and read data in the two buffers and transmit the data to the data calculating unit.

3. The memory block reclaiming judging apparatus according to claim 2, wherein the mode for the data calculating unit to calculate the remaining scheduling times of the data packet based on the required scheduling times for the data packet and the single-time scheduled information is as follows:
    setting the remaining scheduling times for the data packet as the required scheduling times if the data are received from the first buffer; and
    subtracting 1 from the remaining scheduling times for the data packet as a new number of remaining scheduling times for the data packet if the data are received from the second buffer.

4. The memory block reclaiming judging apparatus according to claim 2, wherein, the first buffer and the second buffer are FIFO (first in first out) buffers.

5. The memory block reclaiming judging apparatus according to claim 1, wherein an initial value of the remaining scheduling times for the data packet in the data packet information recording unit is a maximum number of times that the data packet is possibly scheduled.

6. A memory block managing system, the memory block being used to store data packets, and the system comprising a peripheral information generating apparatus, a memory block reclaiming judging apparatus and a memory block reclaiming apparatus, wherein the memory block reclaiming judging apparatus comprises a peripheral information accessing unit, a data packet information recording unit, a data calculating unit, and a comparing and judging unit, wherein,
    the peripheral information accessing unit is configured to buffer and read required scheduling times for a data packet and single-time scheduled information, and transmit the required scheduling times for the data packet and the single-time scheduled information to the data calculating unit;
    the data packet information recording unit is configured to store remaining scheduling times of the data packet and a flag for indicating acquirement of information of the required scheduling times;
    the data calculating unit is configured to calculate the remaining scheduling times of the data packet based on the required scheduling times for the data packet and single-time scheduled information, and write the remaining scheduling times of the data packet into the data packet information recording unit, and meanwhile set the flag for indicating acquirement of information of the required scheduling times as valid;
    the comparing and judging unit is configured to generate a memory block reclaiming instruction when it is judged that the remaining scheduling times of the data packet is 0 and the flag for indicating acquirement of information of the required scheduling times is valid, reset the remaining scheduling times of the data packet in the data packet information recording unit to an initial value, and set the flag for indicating acquirement of information of the required scheduling times as invalid;
    the peripheral information generating unit is configured to generate the required scheduling times for the data packet and the single-time scheduled information, and write the required scheduling times for the data packet and the single-time scheduled information into the peripheral information accessing unit; and
    the memory block reclaiming apparatus is configured to reclaim the memory block according to the memory block reclaiming instruction generated by the comparing and judging unit.

7. The memory block managing system according to claim 6, wherein the peripheral information accessing unit comprises a first buffer, a second buffer and a polling unit, wherein the first buffer buffers the required scheduling times for the data packet, the second buffer buffers the single-time scheduled information of the data packet, and the polling unit is configured to poll the two buffers according to full-empty status thereof, and read data in the two buffers and transmit the data to the data calculating unit.

8. The memory block managing system according to claim 7, wherein the mode for the data calculating unit to calculate the remaining scheduling times of the data packet based on the required scheduling times for the data packet and the single-time scheduled information is as follows:

setting the remaining scheduling times for the data packet as the required scheduling times if the data are received from the first buffer; and subtracting 1 from the remaining scheduling times for the data packet as a new number of remaining scheduling times for the data packet if the data are received from the second buffer.

9. The memory block managing system according to claim 7, wherein the first buffer and the second buffer are FIFO (first in first out) buffers.

10. The memory block managing system according to claim 6, wherein an initial value of the remaining scheduling times for the data packet in the data packet information recording unit is a maximum number of times that the data packet is possibly scheduled.

11. The memory block reclaiming judging apparatus according to claim 2, wherein an initial value of the remaining scheduling times for the data packet in the data packet information recording unit is a maximum number of times that the data packet is possibly scheduled.

12. The memory block reclaiming judging apparatus according to claim 3, wherein an initial value of the remaining scheduling times for the data packet in the data packet information recording unit is a maximum number of times that the data packet is possibly scheduled.

13. The memory block reclaiming judging apparatus according to claim 4, wherein an initial value of the remaining scheduling times for the data packet in the data packet information recording unit is a maximum number of times that the data packet is possibly scheduled.

14. The memory block managing system according to claim 7, wherein an initial value of the remaining scheduling times for the data packet in the data packet information recording unit is a maximum number of times that the data packet is possibly scheduled.

15. The memory block managing system according to claim 8, wherein an initial value of the remaining scheduling times for the data packet in the data packet information recording unit is a maximum number of times that the data packet is possibly scheduled.

16. The memory block managing system according to claim 9, wherein an initial value of the remaining scheduling times for the data packet in the data packet information recording unit is a maximum number of times that the data packet is possibly scheduled.

* * * * *